(No Model.) 3 Sheets—Sheet 2.
H. C. ROOT.
AUTOMATIC TOLL SYSTEM FOR TELEPHONE PAY STATIONS.
No. 440,118. Patented Nov. 4, 1890.
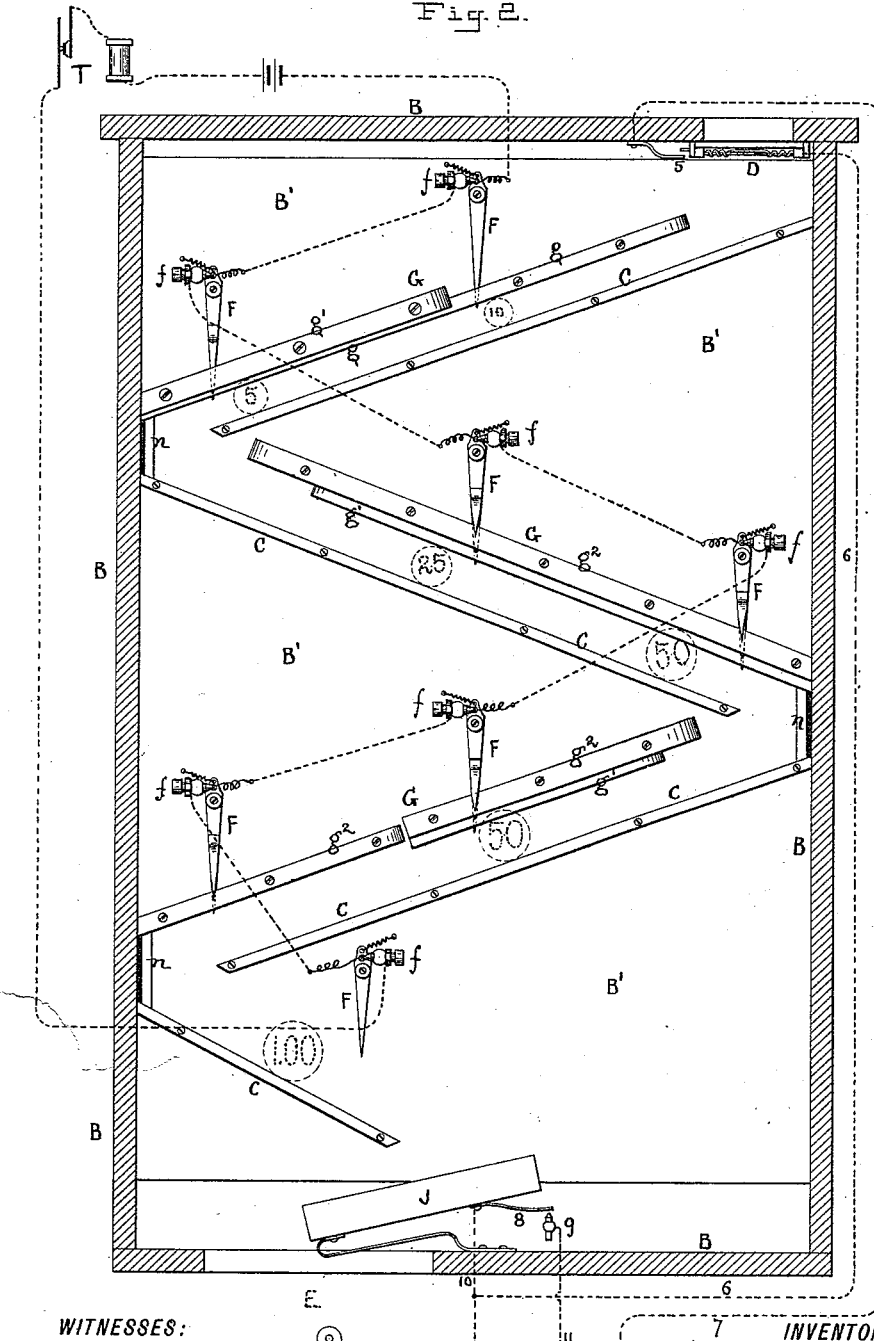
WITNESSES:
John Revell
George Baumann
INVENTOR
Howard C. Root
BY
Howson and Howson
his ATTORNEYS (No Model.) 3 Sheets—Sheet 3.
H. C. ROOT.
AUTOMATIC TOLL SYSTEM FOR TELEPHONE PAY STATIONS.
No. 440,118. Patented Nov. 4, 1890.
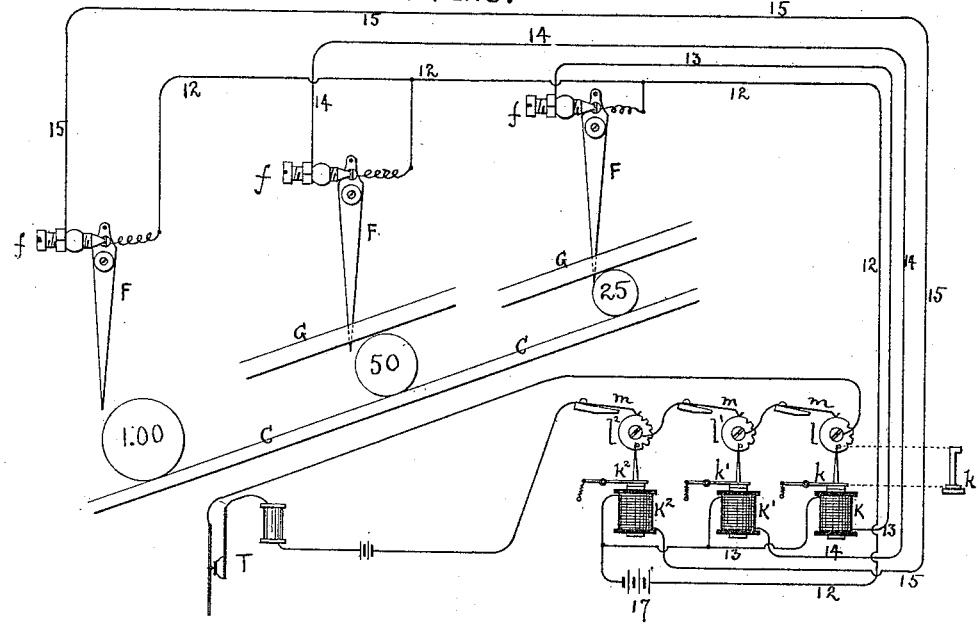
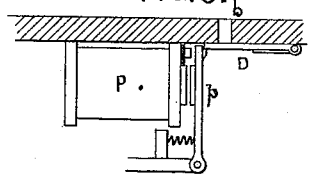
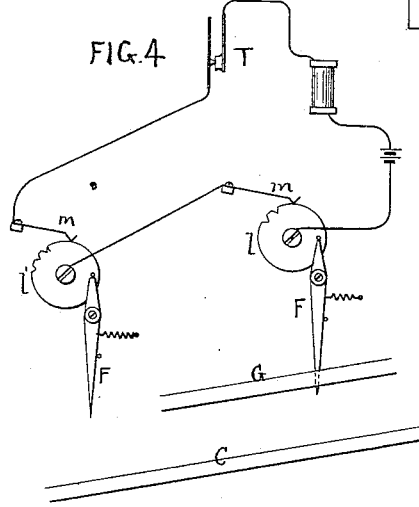
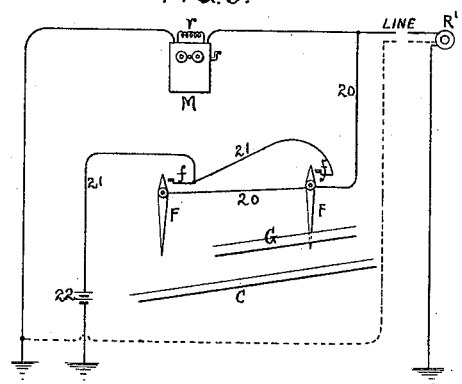
WITNESSES:
George Baumann
John Revell
INVENTOR
Howard C. Root
BY
Howson and Howson,
his ATTORNEYS
THE NORRIS PETERS CO., PHOTO-LITHO., WASHINGTON, D. C.

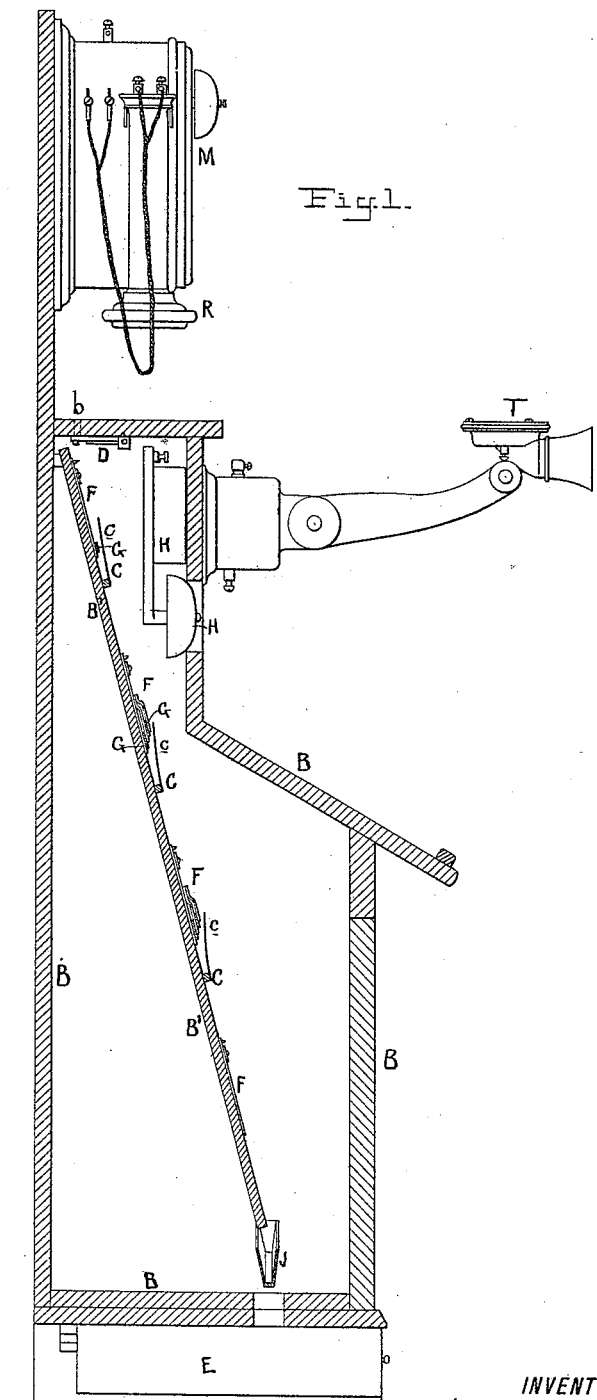

UNITED STATES PATENT OFFICE.

HOWARD C. ROOT, OF BROOKLYN, NEW YORK.

AUTOMATIC TOLL SYSTEM FOR TELEPHONE PAY-STATIONS.

SPECIFICATION forming part of Letters Patent No. 440,118, dated November 4, 1890.

Application filed May 20, 1890. Serial No. 352,502. (No model.)

*To all whom it may concern:*

Be it known that I, HOWARD C. ROOT, a citizen of the United States, and a resident of Brooklyn, New York, have invented Improvements in Automatic Toll Systems for Telephone Pay-Stations, of which the following is a specification.

My invention relates to that class of automatic toll-boxes for telephone pay-stations in which the customer calls up the exchange or central office from the pay-station in the ordinary way, and asks to have the line connected with a certain subscriber, and puts into a receiving-box at the pay-station a coin or other token of the proper value as the toll for the services asked for, and the operator at the exchange is enabled to detect the value of the coin or token which has been put in by the customer at the pay-station.

The object of my invention is to construct a simple apparatus of this character which will not be liable to get out of order, and will be certain in its action and reliable in determining the character or value of the coin or token which is put in the box by the customer.

In the accompanying drawings, Figure 1 is a vertical section of a construction of telephone-instruments embodying one form of my improvements for use at one of the toll or pay stations of a telephone system. Fig. 2 is a diagrammatic sectional view at right angles to Fig. 1, but taken only through the toll-receiving box of the apparatus. Fig. 3 is a diagram illustrating a modification. Figs. 4 and 5 are diagrams of still other modifications, and Fig. 6 is a view of a device which may be used as part of the apparatus.

So far as all the telephonic instruments used at the pay-station are concerned they may be of any usual or convenient construction.

In Fig. 1 I have illustrated the apparatus as consisting of a long-distance transmitter T and magneto-call M and hand-receiver R, all of which may be connected up in the usual way. Below these is the box B, which usually contains one or more cells of battery for the primary circuit-transmitter; but I have made this box considerably larger that it may also contain the chute or runway apparatus for the coins or tokens and the devices for detecting the values of the coins or tokens put into the chute by the customer. The upper part of this box has a slot $b$ at a suitable point for the introduction of the coins or other disk-like tokens, which will be, for convenience, hereinafter referred to as "coins" simply. On the under side of this slot there may be provided a hinged or other spring door D, normally closed to keep out the dust, but which will open under the pressure of the coin introduced by the customer. Immediately below this slot is the upper end of the chute or runway C, which is shown as made up of four sections of reversed inclines, so as to get a long chute within confined space. This chute is mounted upon a back board B', which is set at an incline, so that the coins introduced into the box and passing down the chute will always tend to lie over toward the back board and strike the contact-fingers, hereinafter referred to. To prevent the coins from falling off this runway, it is provided throughout with a guard $c$, which is shown in Fig. 1, but is for convenience of illustration omitted from Fig. 2 and from the remaining figures. At the corners where the inclined sections of the chute reverse directions within the limits of the box I may provide rubber $n$ to lessen the noise and prevent the coins from jumping too much as they pass through the chute. Over this inclined chute are suspended a suitable number of pivoted contact-fingers F—seven of them being shown in the present instance. The upper ends of these contact-fingers are kept by springs normally in electrical contact with back-stops $f$, and all are included in an electrical circuit capable of transmitting a signal to the exchange. This signaling-circuit to the exchange may be independent of the telephone-circuit; but for convenience I prefer to utilize the telephone-circuits for signaling. Thus in the construction shown in Fig. 2 the contact-fingers F and their back-stops are all connected up in a closed circuit through the transmitter T and primary of the induction-coil at the pay-station, so that when the lower end of any one of these fingers F is struck by a coin passing through the chute C the upper end of the finger will break contact with the back-stop and the circuit of the transmitter, through the primary of its induction-coil, will be broken, and this break will of course be reproduced in the telephonic receiver of the operator at the exchange or central station. By suspending these contact-fingers F with their points at different distances from the bottom of the inclined chute different sizes of coins will strike more or fewer of these contact-fingers, and consequently break the circuit of the transmitter more or fewer times in their passage through the chute. In this way the operator at the exchange can detect the value of the coin which is introduced by the customer into the chute.

As it is desirable that no one contact-finger be struck by both the largest and the smallest coin, since there is such a great difference in size between coins—for instance, between a ten-cent piece and a dollar—I combine with the fingers F guards G, which are arranged over the different contact-fingers at different heights from the bottom of the inclined chute, so that some of the larger coins will run over these guards, and be thereby prevented from coming into contact with the fingers for the smaller coins. In connection with this arrangement or system of guards, and in order to reduce the number of contact-fingers, I make some of these contact-fingers forked into two or three points lying over and under guards of different heights. Thus in the present instance the first contact-finger has only one point adapted to be struck by a ten-cent piece, and is protected by a guard-strip $g$ at such a height from the bottom of the inclined chute C that no larger coin than a ten-cent piece can strike this first contact-finger. The second contact-finger has two points, the lower of which, behind the guard-piece $g$, is also adapted to be struck by a ten-cent piece, while the upper point lies over the guard-strip $g$ at such a distance from the bottom of the chute as to be struck by a five-cent piece only. Over this upper finger is a second guard-strip $g'$, which will prevent larger coins—such as a twenty-five-cent piece, fifty-cent piece, &c.—from striking that point of the second contact-finger. The third contact-finger has three points, the lowest one at the proper height to be struck by a twenty-five-cent piece, but by no larger or smaller coin, and protected by a guard-strip $g'$, while the second point of this third contact-finger is adapted to be struck by a fifty-cent piece and is protected by a guard-strip $g^2$. The third point of this third contact-finger F lies over this guard-strip $g^2$, and is adapted to be struck by a coin the size of a dollar. The fourth and fifth contact-fingers F are duplicates of the third, and have their points and guard-strips arranged at similar heights from the bottom of the chute or runway. The sixth contact-finger has two points, the lower one arranged at such a height as to be struck by a passing fifty-cent piece and protected by a guard-strip $g^3$, while the second point of this sixth contact-finger lies over this guard-strip and is adapted to be struck by the dollar. The remaining and seventh contact-finger is in this instance placed at such a height from the bottom of the runway as to be struck only by a coin of the size of a dollar.

It will thus be seen that by the arrangment described the one runway or chute serves for all sizes of coins, and in the particular arrangement illustrated the five-cent piece would break the circuit once, the ten-cent piece would break it twice, the twenty-five-cent piece would break it three times, the fifty-cent piece would break it four times, and the dollar would break it five times in passing through the chute. The points of the fingers are in this instance arranged at such heights from the bottom of the runway and are so protected by the guards that a one-cent piece or a two-cent piece would not strike any one of the fingers. I do not wish to be limited to the specific arrangement described, however, as the chute may have its contact-fingers and guard-strips variously arranged. In the construction illustrated, also, the back-stops $f$ may be adjusted so as to keep the points of the fingers nearer to or farther from the bottom of the chute than as shown. The coins after passing through the chute enter a locked drawer or other receptacle E, which is illustrated in Fig. 1, but which is not shown in Fig. 2.

In order that the operator at the exchange may know when any coin whatever is being introduced into the receiving-box, I prefer to combine with the spring-door D a contact 5, which, with the door, is included in a circuit 6 7 of a battery and call-bell H. This call-bell may be arranged at any suitable point in the box, so that the sound of its ring will act on the transmitter and be heard over the line in the operator's receiving-instruments at the exchange. In order, also, to know when the coin has passed entirely through the chute, and in order to be sure that the signals have not been fraudulently produced by manipulation of the hanger-switch for the hand-phone, for instance, I provide at the bottom of the latter a spring-trough J, carrying a contact-finger 8, and this is so balanced that any weight of coin falling from the bottom of the chute into the trough on its way to the drawer below will press this contact 8 against a back-stop 9 and close the circuit 10 11 through the same bell H, or another, if preferred.

Instead of making the signaling-breaks in the transmitter circuit by having different numbers of fingers F to be struck by different values of coins or tokens, I may provide only one finger for each size of coin, and combine with each of these fingers different characters of make and break devices, such as are found in district-call instruments. I have illustrated in the diagram, Fig. 3, such an arrangement, the first contact-finger F being included with its back-stop in a circuit 12 13, containing an electro-magnet K, with an armature $k$ normally restraining a spring-operated break-wheel $l$. The second contact-finger F, adapted to be operated by a different-sized coin, is, with its back-stop, included in a circuit 12 14, with an electro-magnet K′, having an armature $k'$ normally restraining a spring-operated break-wheel $l'$. The next contact-finger F, with its back-stop, is included in a circuit 12 15, with an electro-magnet K² acting on an armature $k^2$, which normally restrains the spring-operated break-wheel $l^2$. These several circuits, with the electro-magnets, fingers, and back-stops, include a suitable operating-battery 17. Each of the break-wheels $l\ l'\ l^2$ has a spring-contact $m$, and the whole are arranged in series with a normally-closed signaling-circuit to the exchange, as, for instance, through the transmitter T of the telephone. The several break-wheels $l\ l'\ l^2$ have different numbers or characters of breaks, so that when any one of these fingers F is struck to break its circuit through its electro-magnet K K′ K² the armature of the electro-magnet will be released and acted on by its spring, will free the break-wheel, and the signal will be transmitted to the operator at the exchange; but before the break-wheel has completed one revolution the circuit through the finger F and electro-magnet will have closed again, and the armature will have been drawn back into position to stop the break-wheel on the completion of its one revolution. Instead of controlling these break-wheels magnetically from the fingers F, they may be released mechanically, as illustrated, for instance, in diagram, Fig. 4. In this diagram the break-wheels are shown as normally restrained from revolving by pins on the break-wheels resting upon the upper ends of the fingers F. When the point of either finger is struck by a coin passing through the chute, the break-wheel will be released and transmit a corresponding signal, as before; but before the wheel has completed its revolution the finger F will have been returned by its spring to its normal position, where it will be in the path of the pin on the break-wheel.

In some cases it may be preferable to have the contact-fingers F normally on open circuit instead of having them in a circuit normally closed through the transmitter at the pay-station. In such case the circuits may be arranged as indicated in the diagram, Fig. 5, the several contact-fingers F being connected to the line through a conductor 20, while the back-stop of the contact-fingers are connected through a conductor 21 and battery 22 to the ground, as shown in full lines, or to a return-conductor, as indicated in dotted lines, where a metallic circuit is used. In the diagram M is the magneto call-box at the pay-station, while R′ is the receiver of the operator at the central station or exchange. In this arrangement the passing of a coin through the chute will strike one or other of the several contact-fingers, two only being indicated in the diagram, and will close the line-circuit through the battery 22 either through the ground or through the metallic circuit, as the case may be, to the operator's receiver R′ at the central station or exchange. In order that this battery 22 may not be short-circuited through the call-box M, a suitable resistance $r$ is introduced.

It may be desirable in some cases to arrange the apparatus so that the customer cannot introduce his coin at all until he has called up the central exchange, and the operator then allows him to introduce the coin. In such case the spring-door D below the slot $b$ of the chute-box may be normally locked by a latch on the armature $p$ of the electro-magnet P, as shown in Fig. 6. This electro-magnet can be controlled from the central office in any suitable way, so that on the operator closing the circuit through the electro-magnet the armature may be attracted, and the door D then be free to be opened by the introduction of the coin so long as the circuit is kept closed through the electro-magnet P.

I claim as my invention—

1. In an automatic toll-box for telephone pay-stations, the combination of an inclined pay-chute with a number of movable fingers having points arranged at different distances from the bottom of the same chute, and connections, substantially as described, whereby different coins passing through the same chute will transmit different signals to the operator at the exchange, substantially as set forth.

2. In an automatic toll-box for telephone pay-stations, the combination of a box containing an inclined chute with contact-fingers having points arranged at different distances from the bottom of the chute, guard-strips extending over some of the fingers or their points to protect them from being struck by larger coins, and connections, substantially as described, whereby different-sized coins passing through the same chute will give different signals to the exchange.

3. In an automatic toll-box for telephone pay-stations, the combination of a box containing an inclined chute with a series of movable contact-fingers having points, some arranged at different distances from the bottom of the chute, and a signaling-circuit to the exchange, all the contacts being in said circuit, whereby different coins passing through the same chute will transmit different signals to the operator at the exchange, all substantially as described.

4. In an automatic toll-box for a telephone pay-station, the combination of the receiving-box having a chute for the coins, contact-fingers at different distances from the bottom of the chute, and a signaling-circuit to the exchange, having the said contact-fingers in circuit, with a yielding trough at the bottom of the chute to be acted on by the coins or tokens as they pass from the chute, contacts, and a circuit closed through a battery and a bell at the pay-station by the falling of the coin upon the trough, all substantially as set forth.

5. In an automatic toll-box for a telephone pay-station, the combination of a box containing an inclined chute for the coins with a series of movable contact-fingers suspended over the chute with their points at different distances from the bottom thereof, so as to be struck by different sizes of coins, and back-stops for the several contact-fingers, and circuits including the fingers and back-stops, normally closed through the pay-station telephone-transmitter, all substantially as set forth.

In testimony whereof I have signed my name to this specification in the presence of two subscribing witnesses.

HOWARD C. ROOT.

Witnesses:
 JOHN REVELL,
 HUBERT HOWSON.